US011075890B2

(12) United States Patent
Cao et al.

(10) Patent No.: US 11,075,890 B2
(45) Date of Patent: Jul. 27, 2021

(54) WIRELESS COMMUNICATION BETWEEN VEHICLES

(71) Applicant: INTERNATIONAL BUSINESS MACHINES CORPORATION, Armonk, NY (US)

(72) Inventors: Ying Cao, Beijing (CN); Xin Cui, Beijing (CN); Yang Liang, Beijing (CN); Kun Shang, Beijing (CN); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 15/919,106

(22) Filed: Mar. 12, 2018

(65) Prior Publication Data

US 2019/0281027 A1    Sep. 12, 2019

(51) Int. Cl.
| | | |
|---|---|---|
| *H04L 29/06* | (2006.01) | |
| *H04W 4/46* | (2018.01) | |
| *H04W 4/80* | (2018.01) | |
| *G06K 9/00* | (2006.01) | |

(52) U.S. Cl.
CPC ...... *H04L 63/0442* (2013.01); *G06K 9/00791* (2013.01); *H04W 4/46* (2018.02); *H04W 4/80* (2018.02)

(58) Field of Classification Search
None
See application file for complete search history.

(56) References Cited

U.S. PATENT DOCUMENTS

| | | | | |
|---|---|---|---|---|
| 5,774,550 | A | * 6/1998 | Brinkmeyer | ............ B60R 25/00 340/5.7 |
| 5,844,987 | A | * 12/1998 | Matthews | ............. B60R 25/102 340/901 |
| 9,165,198 | B2 | * 10/2015 | Siegel | .................. G08G 1/0175 |
| 9,485,791 | B2 | 11/2016 | Strassenburg-Kleciak | |
| 9,697,733 | B1 | * 7/2017 | Penilla | .................... B60L 53/31 |

(Continued)

FOREIGN PATENT DOCUMENTS

| | | |
|---|---|---|
| CN | 104202673 A | 12/2014 |
| CN | 104575067 A | 4/2015 |
| CN | 105469463 A | 4/2016 |

OTHER PUBLICATIONS

DOT, "An Approach to Communications Security for a Communications Data Delivery System for V2V/V2I Safety: Technical Description and Identification of Policy and Institutional Issues," White Paper, Nov. 2011, p. 1-43, Its Joint Program Office, Research and Innovative Technology Administration, U.S. Department of Transportation.

(Continued)

*Primary Examiner* — Jason Chiang
(74) *Attorney, Agent, or Firm* — Alexis N. Hatzis

(57) ABSTRACT

A method, system and computer program product for wireless communication between vehicles are provided. In the method, identification information of a first vehicle by a second vehicle being spatially close to the first vehicle is obtained. And a first key associated with the first vehicle by using the identification information is acquired. Data originated from the first vehicle and signed with a second key corresponding to the first key are identified with the first key. And then the identified data is processed.

18 Claims, 5 Drawing Sheets

(56) References Cited

U.S. PATENT DOCUMENTS

| | | | | |
|---|---|---|---|---|
| 2011/0238997 A1* | 9/2011 | Bellur | | H04L 63/1458 |
| | | | | 713/176 |
| 2012/0095641 A1* | 4/2012 | Merk | | G08G 1/161 |
| | | | | 701/28 |
| 2013/0160086 A1* | 6/2013 | Katar | | H04L 63/0892 |
| | | | | 726/4 |
| 2015/0016823 A1* | 1/2015 | Strassenburg-Kleciak | | |
| | | | | H04B 10/1143 |
| | | | | 398/115 |
| 2015/0052352 A1 | 2/2015 | Dolev et al. | | |
| 2015/0057838 A1* | 2/2015 | Scholl | | H04W 12/08 |
| | | | | 701/2 |
| 2015/0130600 A1* | 5/2015 | Huang | | G08G 1/166 |
| | | | | 340/438 |
| 2015/0334113 A1* | 11/2015 | Angus | | H04L 63/126 |
| | | | | 713/168 |
| 2015/0363098 A1* | 12/2015 | Grigsby | | B60R 16/0315 |
| | | | | 715/719 |
| 2017/0104824 A1 | 4/2017 | Bajwa et al. | | |
| 2018/0139485 A1* | 5/2018 | Ansari | | G06F 21/32 |
| 2020/0031471 A1* | 1/2020 | Datta Gupta | | B60K 15/04 |

OTHER PUBLICATIONS

DOT, "Vehicle-to-Vehicle (V2V) Communications for Safety," Joint Program Office Intelligent Transportation Systems, p. 1-2, Office of the Assistant Secretary for Research and Technology, https://www.its.dot.gov/research_archives/safety/v2v_comm_safety.htm, Accessed on Mar. 8, 2018.

ITSJPO, "Connected Vehicle: The Future of Transportation," YouTube, Feb. 8, 2016, p. 1, https://www.youtube.com/watch?v=Q8Cn47L8FRQ, Accessed on Mar. 8, 2018.

Mell et al., "The NIST Definition of Cloud Computing," National Institute of Standards and Technology, Sep. 2011, p. 1-3, Special Publication 800-145.

* cited by examiner

WIRELESS COMMUNICATION BETWEEN VEHICLES

BACKGROUND

The present invention relates to wireless communication, and more specifically, to a method, system and computer program product for wireless communication between vehicles.

Vehicle-to-vehicle (V2V) is an automobile technology designed to allow automobiles to "talk" to each other. V2V communications form a wireless ad hoc network on the roads at a time when there is increasing need to improve wireless communication between vehicles.

SUMMARY

According to one embodiment of the present invention, there is provided a method for wireless communication between vehicles. In the method, identification information of a first vehicle by a second vehicle being spatially close to the first vehicle is obtained. And a first key associated with the first vehicle by using the identification information is acquired. Data originating from the first vehicle is identified with the first key, wherein the data is signed with a second key corresponding to the first key. And then the identified data is processed.

According to another embodiment of the present invention, there is provided a system for wireless communication between vehicles. The system comprises one or more processors, a memory coupled to at least one of the processors and a set of computer program instructions stored in the memory and executed by at least one of the processors in order to perform actions of obtaining identification information of a first vehicle by a second vehicle being spatially close to the first vehicle; acquiring a first key associated with the first vehicle by using the identification information; identifying data originated from the first vehicle with the first key, the data being signed with a second key corresponding to the first key; and processing the identified data.

According to another embodiment of the present invention, there is provided a computer program product comprising a computer readable storage medium having program instructions embodied therewith, wherein the computer readable storage medium is not a transitory signal per se, the program instructions readable by a device to cause the device to perform a method comprising: obtaining identification information of a first vehicle by a second vehicle being spatially close to the first vehicle; acquiring a first key associated with the first vehicle by using the identification information; identifying data originating from the first vehicle with the obtained first key, the data being signed with a second key corresponding to the first key; and processing the identified data.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
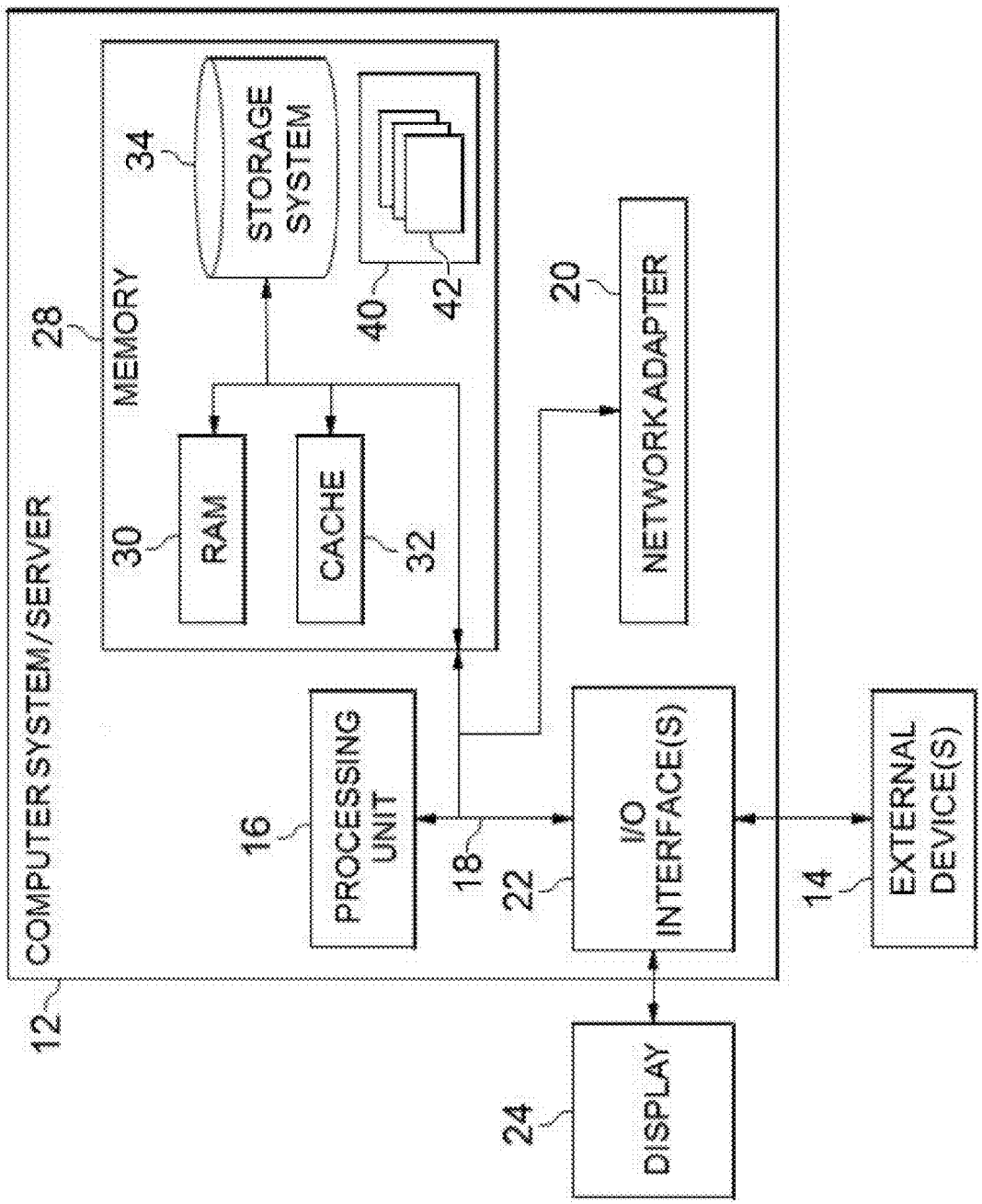
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Embodiments of the present invention can be deployed on cloud computer systems which will be described below. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. A cloud computing node is only one example of a suitable cloud computing node and is not intended to suggest any limitation as to the scope of use or functionality of embodiments of the invention described herein. Regardless, a cloud computing node is capable of being implemented and/or performing any of the functionality set forth hereinabove.

In a cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in a cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

A cloud computing environment is service oriented with a focus on statelessness, low coupling, modularity, and semantic interoperability. At the heart of cloud computing is an infrastructure comprising a network of interconnected nodes.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
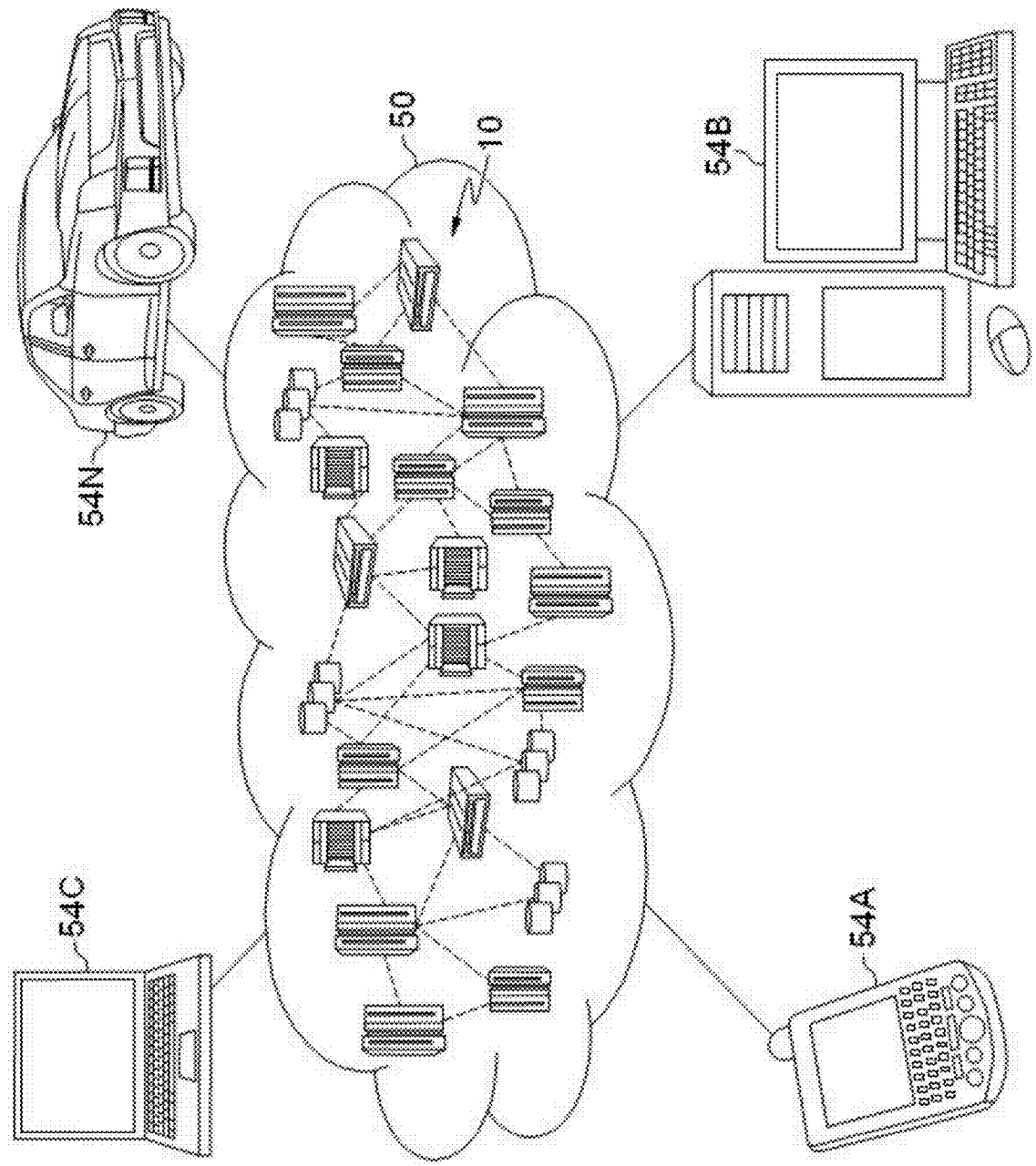
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
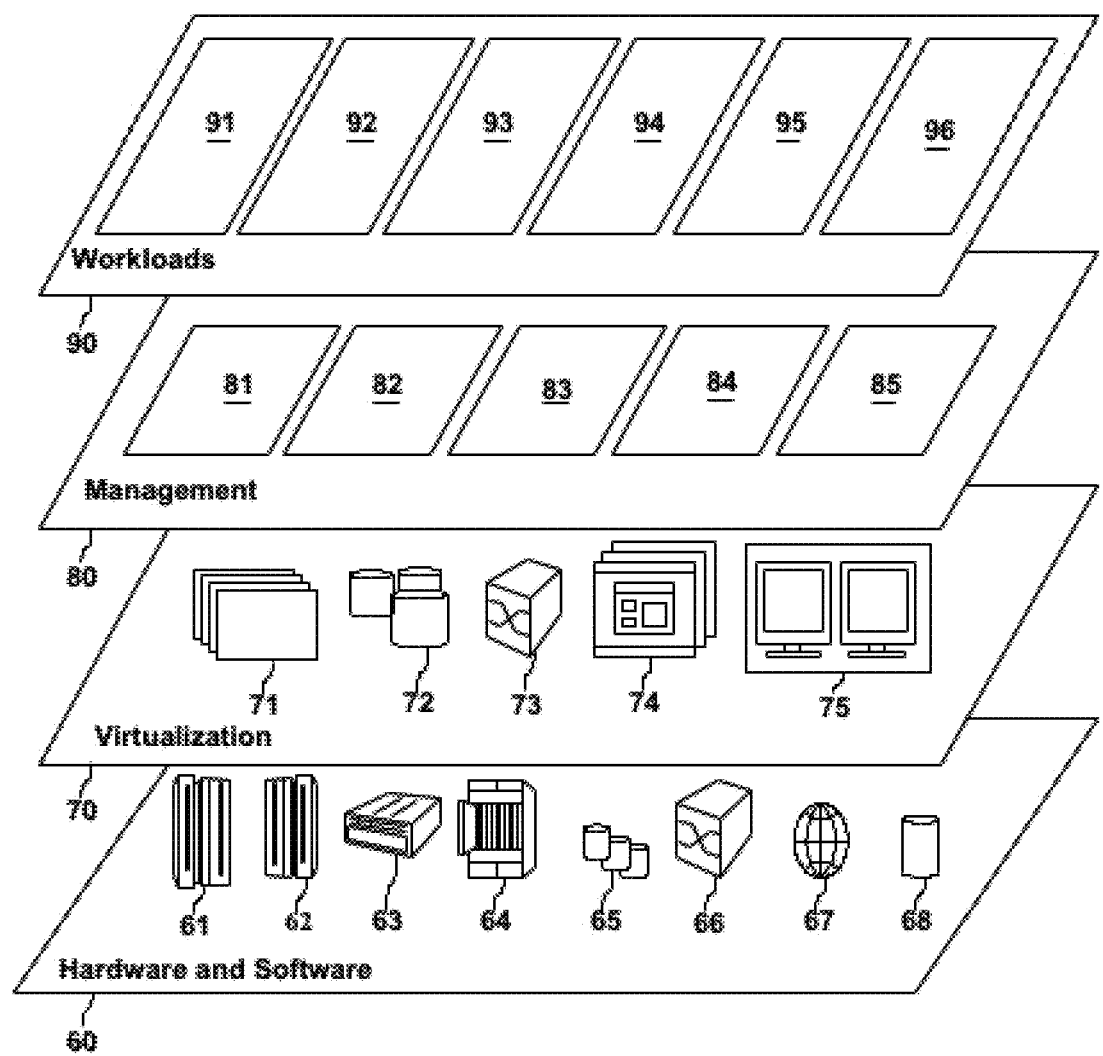
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wireless communication between vehicles 96.

When driving on the road, the driver in the car often wants to be able to know about the traffic situation ahead, especially when there is a large truck in front. It would be much safer if the driver could view the traffic situation in front of the vehicle which is travelling ahead.

There are some existing solutions to share a front vehicle's view with a vehicle following it. Examples of such solutions may include the use of drones, sharing information via a traffic radio, or the public camera, etc. Another example of such solutions is to put a camera to the front of a large, slow-moving truck and connect it to video displays on the back of the truck, thereby informing trailing drivers whether it's safe to overtake the truck. However, those existing solutions have disadvantages of high cost, not real-time, or inconvenience etc.

Vehicle-to-vehicle (V2V) or car-2-car is an automobile technology designed to allow automobiles to "talk" to each other. V2V communications form a wireless ad hoc network on the roads. In a V2V communication, a wireless radio link between vehicles is used, for example, to transmit data obtained from the sensor system of a vehicle to other vehicles in the vicinity. As a result, data can be transmitted quickly from one vehicle to other vehicles. However, in these methods, the vehicle which receives the data in a wireless fashion could not specify a specific vehicle from which data is to be received, or the vehicle could not know the data received are from which vehicle. Therefore, it would be advantageous to provide a method and system for receiving data from a specific vehicle, especially from a vehicle travelling ahead.

Considering the above issues, a solution for wireless communication between vehicles is provided here, which may be used to receive data from a specific vehicle. With this solution, the back vehicles may receive traffic related information from vehicles ahead.

Furthermore, since many of the vehicles have in-vehicle cameras, either a car driving recorder or a 360-degree road camera, and such devices have become increasingly popular for vehicles, with the solution provided here, back vehicles can receive the view of a front vehicle ahead captured by the front vehicle.

Figure 4:
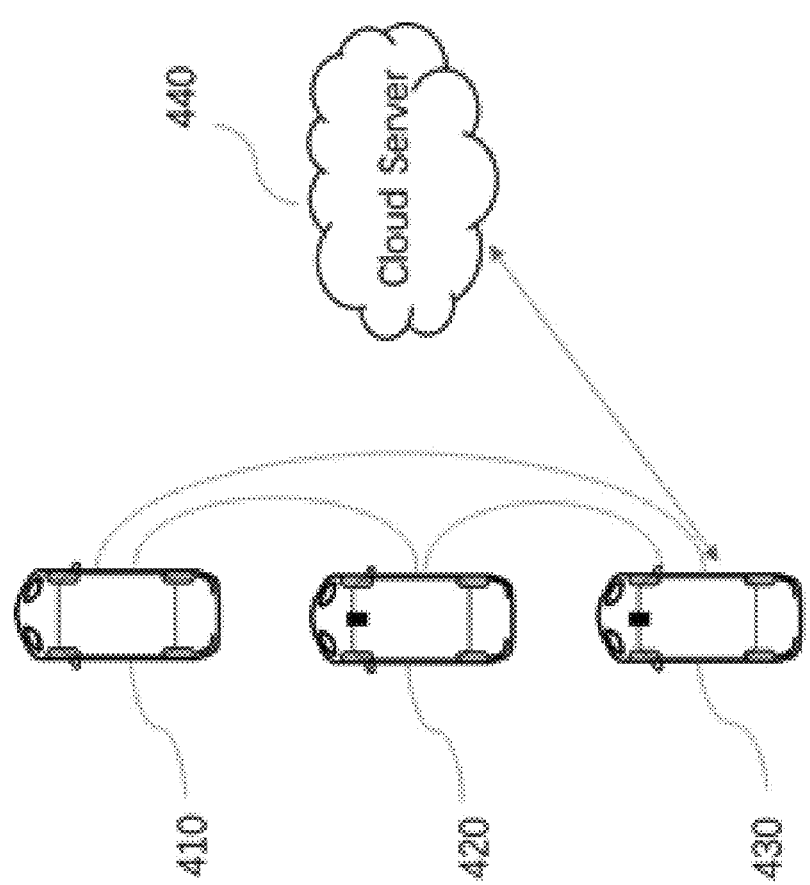
FIG. 4 depicts a diagram showing an illustrative scenario in which a method according to one embodiment of the present invention may be applied.

FIG. 4 is a diagram showing an illustrative scenario in which a method according to one embodiment of the present invention may be applied. As shown in FIG. 4, vehicle 410, vehicle 420 and vehicle 430 are moving on a road. Vehicle 410 is traveling directly ahead of vehicle 420, which is traveling directly ahead of vehicle 430. Vehicle 410, vehicle 420 and vehicle 430 may transmit and receive data to and from nearby vehicles through a cloud server 440, or through various wireless connections, such as Bluetooth, WiFi, Zig-Bee, etc. The nearby vehicle may be detected by location-based service, or the above mentioned wireless connections.

A person skilled in the art would understand that the location relationship among vehicle 410, vehicle 420, and vehicle 430, as shown in FIG. 4, is merely illustrative. Vehicle 410, vehicle 420, and vehicle 430 may be spatially adjacent or close to each other. It is possible that the three vehicles are traveling on different roads or on different lanes of the same road. It is also possible that there are other vehicles traveling alongside vehicles 410, 420 or 430.

Figure 5:
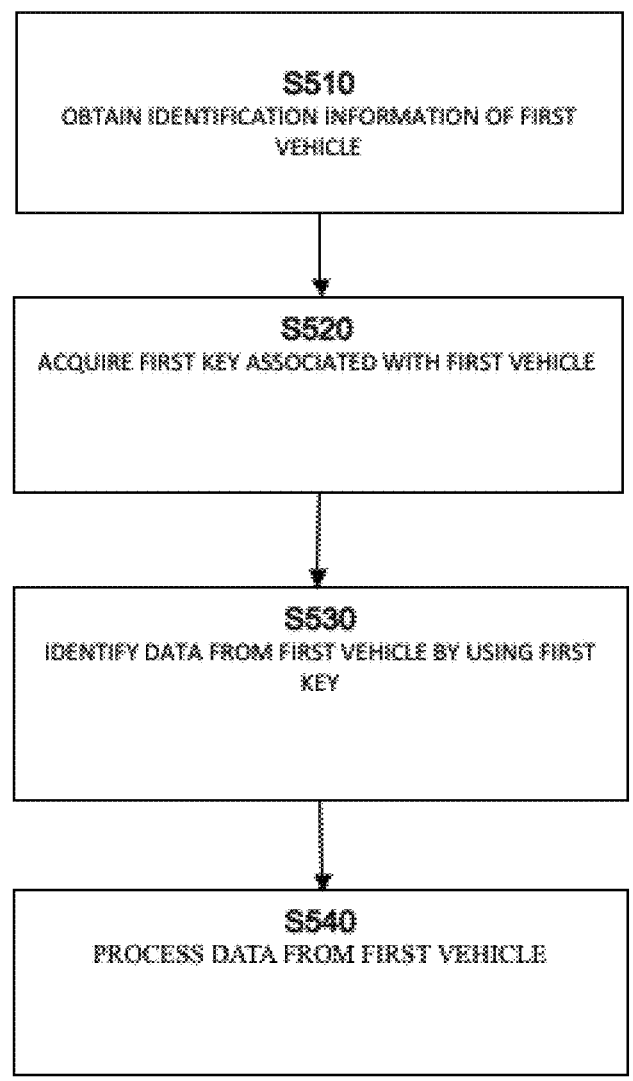
FIG. 5 depicts a flowchart illustrating a method of wireless communication between vehicles according to an embodiment of the present invention.

Referring now to FIG. 5, a flowchart of a method of wireless communications between vehicles according to an embodiment of the present invention is depicted.

In step S510, identification information of a first vehicle may be obtained by a second vehicle, which is spatially close to the first vehicle. According to an embodiment of the present invention, the identification information may be a license plate number, which is unique for each of the vehicles. In other embodiments, the identification information may also include other types of vehicle information, such as model, type, color, shape, etc. More generally, the identification information may include any suitable information which may be used to identify the vehicles. The term "spatially close to" may mean that the distance between two or more vehicles is within a range. A person skilled in the art would understand that the range may vary under different situations.

In step S520, a first key associated with the first vehicle may be acquired by using the obtained identification information. That is, the first key may be acquired by the second vehicle with the identification information obtained in step S510. According to an embodiment of the present invention, the first key may be a public key of a key pair assigned to the first vehicle and corresponding to the identification information of the first vehicle.

In step S530, data originated from the first vehicle may be identified with the acquired first key. The data originated from the first vehicle are signed with a second key corresponding to the first key. According to an embodiment of the present invention, the second key may be a private key of the key pair assigned to the first vehicle. A person skilled in the art would understand that any suitable asymmetric cryptography may be used here to sign and verify the data originated from the first vehicle.

In step S540, the identified data may be processed. According to one embodiment of the present invention, the identified data may include video data, and the video data may be displayed in the second vehicle. According to another embodiment of the present invention, the data may be broadcasted or transmitted to other vehicles.

Next, let's use the vehicles shown in FIG. 4 as examples to illustrate the process shown in FIG. 5 in more detail.

According to embodiments of the present invention, in step S510, the second vehicle may obtain the identification information of the first vehicle in different ways.

According to one embodiment of the present invention, the identification information may be obtained from an image of the first vehicle. In other words, given an image of the first vehicle, the identification information of the first vehicle may be derived from it. Any suitable image recognition technology may be employed for this purpose, as will be appreciated by those skilled in the art.

The image of the first vehicle may be captured by a camera in the second vehicle. Assume, in the scenario in FIG. 4, vehicle 420 has a camera facing forward. When vehicle 410 is travelling in front of vehicle 420, the camera may take a picture or a video of vehicle 410 and obtain the plate number of vehicle 410 through image recognition techniques. As mentioned earlier, the plate number may serve as the identification information of vehicle 410.

According to another embodiment of the present invention, the identification information may be obtained from the data obtained from another vehicle. For example, in the scenario in FIG. 4, vehicle 430 is travelling after vehicle 420 and thus unable to capture an image of vehicle 410 with its camera directly. However, vehicle 430 may obtain the plate number of vehicle 410 from vehicle 420, which may have obtained the plate number of vehicle 410 as described in the above. Alternatively, vehicle 430 may obtain the image of vehicle 410 from vehicle 420 and then derive the plate number of vehicle 410 through image recognition.

According to another embodiment of the present invention, the identification information of the first vehicle may be input manually for the second vehicle. For example, in the scenario in FIG. 4, if the driver or passenger of vehicle 430 is aware of the plate number of vehicle 410 and would like to know about the traffic situation in front of vehicle 410, he/she may manually input the plate number of vehicle 410 as identification information in order to receive the data transmitted from vehicle 410.

Although the plate number is used here as an example of identification information, a person skilled in the art would understand that the identification information is not limited to that and may include any information suitable for identifying the vehicle, including, but not limited to, model type, color, or any other observable features.

According to embodiments of the present invention, a vehicle profile may be created for each vehicle in advance. The vehicle profile may contain vehicle related information, plate number and a pair of cryptographic keys (that is, a public key and a private key). A person skilled in the art would understand that any suitable asymmetric cryptography may be used here, such as RAS, Elgamal, Rabin, ECC and so on.

The vehicle profile may be saved on a cloud server. For example, vehicles, such as vehicles 410, 420 and 430, may be periodically registered with its national or regional transportation authority, which allocates a unique identifier to each of them. In addition, a private/public key pair is also assigned to each vehicle. With this arrangement, in step S520, the second vehicle may acquire the public key associated with the first vehicle from the cloud server. The second vehicle may transmit the identification information of the first vehicle obtained in step S510 to the cloud server. The cloud server retrieves the public key associated with the first vehicle with the received identification information, and sends back to the second vehicle.

As an alternative to the cloud server, the vehicle profile may also be saved locally in the vehicle. For example, after receiving the public key associated with the first vehicle, the second vehicle may save the obtained public key and the identification information of the first vehicle as the first vehicle's profile locally for future use. And next time when the second vehicle wants to obtain the first vehicle's public key, it may retrieve it from local. In this case, for the step S520, the second vehicle may use the identification information of the first vehicle to search the profiles it saved locally and acquire the public key associated with the first vehicle.

After having acquired the public key associated with the first vehicle, the second vehicle may use the public key to identify the data originated from the first vehicle for further processing.

As described above, in step S530 in FIG. 5, the second vehicle may identify the data originated from the first vehicle with the public key of the first vehicle. And the data originated from the first vehicle have been signed with a private key of the first vehicle and received by the second vehicle.

Various ways may be used by the first vehicle to sign the data to be shared with other vehicles. And the timing of transmissions of the data from the first vehicle could be decided and activated by a user (for example, the driver of the first vehicle). Or, it could be activated by some of automatic determination methods based on data of various sensors, image recognition or cognitive computing. The data sharing may be activated when some predetermined rules are satisfied, such as when there is an accident or a traffic jam ahead.

According to embodiments of the present invention, the first vehicle may sign the to-be-transmitted data with its private key. The signed data from the first vehicle may be sent to adjacent vehicles through a cloud server or various wireless connections, such as Bluetooth, WiFi, ZigBee, etc. The adjacent vehicles may be detected by location-based service, or these wireless connections.

Various methods may be used to sign the data to be transmitted. According to one embodiment of the present invention, the first vehicle may encrypt the data with its private key to generate an encrypted data, and transmit the encrypted data to neighbor vehicles through a cloud server or wireless connections. If the second vehicle can decrypt the encrypted data with the obtained public key of the first vehicle, it can be determined that the received data is from the first vehicle.

According to another embodiment of the present invention, the first vehicle may perform hash computation on the video data to generate a hash value. The first vehicle may encrypt the generated hash value with its private key to generate a digital signature, and transmit the video data along with the corresponding digital signature to its neighbor vehicles, including the second vehicle, through a cloud server or wireless connections.

The second vehicle may receive the digital signature and data from multiple vehicles. And with the acquired public key of the first vehicle, the second vehicle would be able to decrypt the digital signature received from the first vehicle. The second vehicle may also perform hash computation on the received video data to generate a new hash value, and compare the new generated hash value with the decrypted digital signature. If the value of the decrypted digital signature is equal to the generated hash value, it indicates that the corresponding video data is from the first vehicle, and the second vehicle may process the corresponding video data.

Considering that it may take much time and system resources for the second vehicle to perform hash computation on the received video data, especially when it may receive data from multiple vehicles, according to another embodiment of the present invention, the first vehicle may transmit the hash value together with the video data and the digital signature to its neighbor vehicles. The second vehicle may receive hash values, digital signatures and data from multiple vehicles. And with the acquired public key of the first vehicle, the second vehicle would be able to decrypt the digital signature received, and compare it with the received hash value. If the value of the decrypted digital signature is equal to the hash value received from the first vehicle, it indicates that the corresponding video data is from the first vehicle, and the second vehicle may process the corresponding video data.

To further reduce the time and resources for receiving video data from multiple vehicles, the second vehicle may only receive hash values and digital signatures from multiple vehicles first. And after the second vehicle has verified the digital signature from the first vehicle, it starts to receive the corresponding video data transmitted from the first vehicle.

After receiving the video data from the first vehicle, the second vehicle may process the data in various ways in step S540 in FIG. 5. Here we use the video data as an example to describe the process to the data.

According to an embodiment of the present invention, the second vehicle may display the received video data. Thus, the driver of the second vehicle may view the traffic situation in front of the first vehicle.

According to another embodiment of the present invention, the second vehicle may combine the received video data with the video data from its front camera, and display to the driver. Thus, the driver of the second vehicle can see not only the first vehicle in front of it (with data from its camera), but also the view of the first vehicle (with data from the first vehicle).

According to another embodiment of the present invention, the second vehicle may sign the video data received from the first vehicle with the private key of the second vehicle, and transmit to other neighbor vehicles. Thus, other neighbor vehicle may also receive the video data of the first vehicle, even it cannot obtain the identification information of the first vehicle.

According to another embodiment of the present invention, the second vehicle may transmit the combined data which includes the video data from the first vehicle and the video data from the second vehicle to other neighbor vehicles. And after other neighbor vehicle receives the combined data from the second vehicle, it can also combine the video data from its camera with the combined data, showing not only a series of vehicles in front of it, but also the view of first vehicle in the series of vehicle.

Next, we'll use the scenario in FIG. 4 as an example to provide a detailed description about the process according to one embodiment of the present invention.

As shown in FIG. 4, vehicle 410 is moving directly ahead of vehicle 420, and vehicle 420 is traveling directly ahead of vehicle 430.

With the above described process, each of vehicle 410, 420 and 430 has an in-vehicle video camera facing forward and is equipped with corresponding transmitting and receiving means for vehicle-to-vehicle communications.

The video data captured by the camera in each vehicle are signed with a private key assigned to that vehicle. The vehicle may either store its private key locally or obtain its private key from a server. And then each vehicle broadcasts or transmits the signed data to vehicles in the vicinity. So, vehicle 410 will receive data from vehicle 420 and 430, vehicle 420 will receive data from vehicle 410 and 430, and vehicle 430 will receive data from vehicle 410 and 420.

If vehicle 420 would like to view the traffic situation in front of vehicle 410 which is traveling ahead, it will analyze the video data captured by its in-vehicle camera to identify the plate number of vehicle 410.

After vehicle 420 recognizes the plate number of vehicle 410, it may send the plate number to the server to query the public key of vehicle 410 from the vehicle profiles maintained by the server.

As described above, vehicle 420 may receive multiple sharing data from other nearby vehicles at the same time. Under such situation, vehicle 420 may use the public key of vehicle 410 to verify the signatures of all sharing data, to identify which data come from vehicle 410. Then the identified sharing data would be processed by vehicle 420.

Similar process will take place in vehicle 430, which is travelling after vehicle 420. Vehicle 430 will identify the plate number of vehicle 420 and obtain vehicle 420's public key with the plate number, and then identify video data transmitted from vehicle 420 with vehicle 420's public key.

At the same time, if vehicle 430 would like to further know about the traffic conditions in front of vehicle 410, it may also obtain the identification information of vehicle 410 to get the corresponding public key of vehicle 410, and then identify the video data sent from vehicle 410 with the public key of vehicle 410.

Vehicle 430 may obtain the identification information of vehicle 410 by various ways. The identification information of vehicle 410 may be obtained from an image captured by a camera in vehicle 420. And vehicle 420 may transmit the information to vehicle 430 through the process which has been described above, or through a secure communication link which has been established between vehicles 420 and 430.

Alternatively, vehicle 420 may transmit the image or video it has captured to vehicle 430. While vehicle 430 cannot obtain the plate number of vehicle 410 from its camera directly, vehicle 430 may obtain video data from vehicle 420, and identify the plate number of vehicle 410 from the image/video data captured by the camera of vehicle 420.

Furthermore, vehicle 420 may process the video data captured by its camera and the video data it has received from vehicle 410. For example, vehicle 420 may combine the video data together, showing a view as if vehicle 410 is transparent or half transparent.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining a plurality of identification information of a specified first vehicle by a second vehicle, including a hash value, the second vehicle being in a linear spatial relationship with, but not directly behind, the first vehicle, wherein the second vehicle is unable to capture an image of the first vehicle by a camera on the second vehicle directly;
    transmitting, by the first vehicle, a plurality of neighboring vehicle information, including a plurality of neighboring vehicle hash values and a plurality of neighboring vehicle digital signatures;
    acquiring a first key associated with the first vehicle based on the obtained identification information;
    identifying a plurality of first vehicle data based on the first key, the first vehicle data being signed with a second key corresponding to the first key; and
    processing the identified plurality of first vehicle data, wherein the plurality of first vehicle data is first video data captured by an in-vehicle camera in the first vehicle.

2. The method of claim 1, wherein the first key and the second key are a public key and a private key, respectively, of an asymmetric key pair assigned to the first vehicle.

3. The method of claim 1, wherein processing the identified plurality of first vehicle data further comprises displaying the captured first video data in the second vehicle.

4. The method of claim 1, wherein processing the identified plurality of first vehicle data further comprises:
    obtaining a plurality of second video data captured by a camera in the second vehicle and a plurality of third video data captured by a camera in a third vehicle, wherein the first vehicle, the second vehicle, and the third vehicle are moving on a road in a linear spatial relationship;
    combining the identified plurality of first video data with the obtained plurality of second video data and the obtained plurality of third video data into combined video data; and
    displaying the combined video data.

5. The method of claim 1, wherein obtaining a plurality of identification information of the first vehicle by the second vehicle, the second vehicle being in a linear spatial relationship with the first vehicle further comprises:
    obtaining an image of the first vehicle; and
    identifying the plurality of identification information of the first vehicle based on the obtained image.

6. The method of claim 5, wherein the obtained image of the first vehicle is captured by a camera in the second vehicle or by a camera in a third vehicle being spatially close to the first vehicle.

7. The method of claim 1, wherein the plurality of identification information is a license plate number of the first vehicle.

8. The method of claim 1, wherein processing the identified plurality of first vehicle data further comprises:
    signing the plurality of identification information with a third key associated with the second vehicle; and
    transmitting the signed plurality of identification information to a third vehicle.

9. A computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising;
    obtaining a plurality of identification information of a specified first vehicle by a second vehicle, including a hash value, the second vehicle being in a linear spatial relationship with, but not directly behind, the first vehicle, wherein the second vehicle is unable to capture an image of the first vehicle by a camera on the second vehicle directly;

transmitting, by the first vehicle, a plurality of neighboring vehicle information, including a plurality of neighboring vehicle hash values and a plurality of neighboring vehicle digital signatures;

acquiring a first key associated with the first vehicle based on the obtained identification information;

identifying a plurality of first vehicle data based on the first key, the first vehicle data being signed with a second key corresponding to the first key; and processing the identified plurality of first vehicle data, wherein the plurality of first vehicle data is first video data captured by an in-vehicle camera in the first vehicle.

10. The computer system of claim 9, wherein the first key and the second key are a public key and a private key, respectively, of an asymmetric key pair assigned to the first vehicle.

11. The computer system of claim 9, wherein processing the identified plurality of first vehicle data further comprises:

obtaining a plurality of second video data captured by a camera in the second vehicle and a plurality of third video data captured by a camera in a third vehicle, wherein the first vehicle, the second vehicle, and the third vehicle are moving on a road in a linear spatial relationship;

combining the identified plurality of first video data with the obtained plurality of second video data and the obtained plurality of third video data into combined video data; and displaying the combined video data.

12. The computer system of claim 9, wherein obtaining a plurality of identification information of the first vehicle by the second vehicle, the second vehicle being in a linear spatial relationship with the first vehicle further comprises:

obtaining an image of the first vehicle; and identifying the plurality of identification information of the first vehicle based on the obtained image.

13. The computer system of claim 12, wherein the obtained image of the first vehicle is captured by a camera in the second vehicle or by a camera in a third vehicle being spatially close to the first vehicle.

14. A computer program product comprising a computer readable storage medium having program instructions embodied therewith, wherein the computer readable storage medium is not a transitory signal per se, the program instructions readable by a device to cause the device to perform a method comprising:

obtaining a plurality of identification information of a specified first vehicle by a second vehicle, including a hash value, the second vehicle being in a linear spatial relationship with, but not directly behind, the first vehicle, wherein the second vehicle is unable to capture an image of the first vehicle by a camera on the second vehicle directly;

transmitting, by the first vehicle, a plurality of neighboring vehicle information, including a plurality of neighboring vehicle hash values and a plurality of neighboring vehicle digital signatures;

acquiring a first key associated with the first vehicle based on the obtained identification information;

identifying a plurality of first vehicle data based on the first key, the first vehicle data being signed with a second key corresponding to the first key; and processing the identified plurality of first vehicle data, wherein the plurality of first vehicle data is first video data captured by an in-vehicle camera in the first vehicle.

15. The computer program product of claim 14, wherein the first key and the second key are a public key and a private key, respectively, of an asymmetric key pair assigned to the first vehicle.

16. The computer program product of claim 14, wherein the plurality of first vehicle data is first video data captured by a camera in the first vehicle.

17. The computer program product of claim 14, wherein obtaining a plurality of identification information of the first vehicle by the second vehicle, the second vehicle being in a linear spatial relationship with the first vehicle further comprises:

obtaining an image of the first vehicle; and identifying the plurality of identification information of the first vehicle based on the obtained image.

18. The computer program product of claim 17, wherein the obtained image of the first vehicle is captured by a camera in the second vehicle or by a camera in a third vehicle being spatially close to the first vehicle.

* * * * *